United States Patent [19]
Mahoney

[11] Patent Number: 5,089,118
[45] Date of Patent: Feb. 18, 1992

[54] SETTLING TANK SPRAY SYSTEM

[76] Inventor: John Mahoney, R.D. #2, Box 6, Schohaire Plank Rd., Altamont, N.Y. 12099

[21] Appl. No.: 586,795

[22] Filed: Sep. 24, 1990

[51] Int. Cl.$^5$ .............................................. B01D 21/28
[52] U.S. Cl. .................. 210/153; 210/242.1; 210/523; 210/525; 210/541
[58] Field of Search ............ 210/153, 241, 242.1, 210/242.3, 523, 524, 525, 541, 169, 776

[56] References Cited

U.S. PATENT DOCUMENTS

| | | | |
|---|---|---|---|
| 1,232,370 | 7/1917 | Morrison | 210/525 |
| 2,417,688 | 3/1947 | Jeffery | 210/525 |
| 3,263,811 | 8/1966 | Baker et al. | 210/169 |
| 3,568,839 | 3/1971 | Dunlea, Jr. | 210/525 |
| 3,762,169 | 10/1973 | Graham | |
| 3,847,815 | 11/1974 | Chastan-Bagnis | 210/242.3 |
| 3,919,090 | 11/1975 | Shaffer | 210/523 |
| 4,033,869 | 7/1977 | McGrew | 210/242.3 |
| 4,128,068 | 12/1978 | Ogura et al. | 210/242.3 |
| 4,618,430 | 10/1986 | Favret, Jr. et al. | |
| 4,640,784 | 2/1987 | Cant | |
| 4,659,458 | 4/1987 | Chin et al. | 210/776 |

FOREIGN PATENT DOCUMENTS 709676  5/1965  Canada.

Primary Examiner—Stanley S. Silverman
Assistant Examiner—Christopher Upton
Attorney, Agent, or Firm—Schmeiser, Morelle & Watts

[57] ABSTRACT

A spraying system to be used on wastewater settling tanks for skimming the top scum layer into a drain. The system includes a spray nozzle that causes the top liquid layer to move in a circular fashion about the center of the tank. The nozzle can be in the form of a wall mounted spray unit that sprays water onto the surface of the contained wastewater. The nozzle can also be in the form of a multiorificed tubular body mounted directly onto the top of the drain trough. Water sprayed from the latter nozzle is directed into the trough and thereby causes a suctioning of the scum layer into the drain. The system can employ either of the nozzles or both nozzles in combination.

14 Claims, 2 Drawing Sheets

SETTLING TANK SPRAY SYSTEM

FIELD OF THE INVENTION

The invention is in the field of wastewater treatment equipment. More particularly, the invention is a spray system that can be added to a wastewater settling tank for the purpose of facilitating the removal of the top layer of floating matter contained within the tank.

BACKGROUND OF THE INVENTION

Wastewater treatment plants commonly direct wastewater into a settling tank to remove, by gravitational settling, suspended particles that are heavier than water. Settling tanks are often circular in shape and have a depth of about ten feet. The diameter of a tank is from 35 to 100 feet and is dependent on the total amount of wastewater to be treated and the number of tanks used.

Settling tanks are also used to remove matter that is of less density than water and therefore can be seen floating on the surface of the water within the tank. This floating material is commonly referred to as scum and is comprised of one or a combination of the following substances: grease, oil, algae or low density waste material.

To accomplish removal of the floating material, skimmers are often employed to push the scum into a drain trough. Most skimmers are in the form of an elongated paddle that has one side in contact with the scum layer and the other side attached to a rotatable boom. The boom is connected to a motor that causes it to rotate about the center of the tank. As the blade rotates within the tank, it sweeps the floating scum layer outwardly toward the perimeter of the tank. To catch the scum and drain it from the tank, a rectangular drain trough is located within the tank proximate its periphery and acts as a drain inlet. The trough includes an angled scumboard or baffle plate that has one end submerged in the water and the other end atop a drain opening at a height even with or slightly above the water level within the tank. As the scum is pushed outwardly by the skimmer, it moves into the trough, passes over the elevated end of the scum board and falls into the drain.

Skimmers are widely used even though there are a number of problems associated with their use. They are expensive to operate since they are electrically powered and must operate continually. There is a considerable amount of maintenance that must be performed on the skimmers because they are adversely affected by both the weather and by the relatively harsh liquids contained within the tanks. A skimmer also lacks a high degree of efficiency since the scum often moves around the drain trough without going in. Finally, in areas that experience at least occasional cold temperatures, a skimmer becomes sluggish and bogged down as it moves through the increasingly viscous liquid. If the skimmer should become covered with ice or snow, it becomes either totally inoperable or almost completely ineffective.

SUMMARY OF THE INVENTION

The invention is a spray system that can functionally replace the skimmer of the prior art. The spray system can be incorporated into an existing settling tank and is capable of functioning reliably in almost any weather.

The preferred embodiment of the spray system makes use of two different spray nozzles to move the surface scum into the drain opening of the drain trough. A surface spray nozzle is used to spray liquid onto the surface of the tank and is located proximate the tank's peripheral outer wall. A trough nozzle assembly is located proximate the scumboard of the drain trough and sprays onto the scumboard in a manner that causes a suctioning (vacuum) action on the tank's surface layer. Either of the nozzles can be used alone to replace the conventional skimmer and therefore separate use of either of the nozzles can be considered an alternate embodiment of the invention.

The surface spray nozzle is mounted on a movable support that enables the nozzle to be positioned at any location on the tank's outer wall. In this manner, the nozzle can be moved to the location on the tank where it will have maximum effectiveness based on the location of the drain trough and on the ambient weather conditions (wind, rain, etc.).

The trough mounted nozzle is located on the inlet portion of the drain trough and is preferably mounted proximate the submerged end of the scumboard. The nozzle includes a plurality of liquid outlet ports that are positioned so that they spray onto the scumboard in a direction that causes the water to flow towards the drain opening.

Each of the two nozzles are designed to be connected to a pressurized liquid source by suitable piping. Preferably, the liquid to be sprayed is at least semi-clean water to thereby minimize any possible clogging of the nozzle outlet port(s).

When used singly, either of the nozzles can direct the tank's scum layer into the drain opening of the drain trough. When used together, maximum effectiveness and speed is realized since the surface spray nozzle acts to concentrate the scum in the region of the trough and the trough nozzle acts to rapidly suction the concentrated scum layer into the drain.

DETAILED DESCRIPTION OF THE INVENTION

Figure 1:
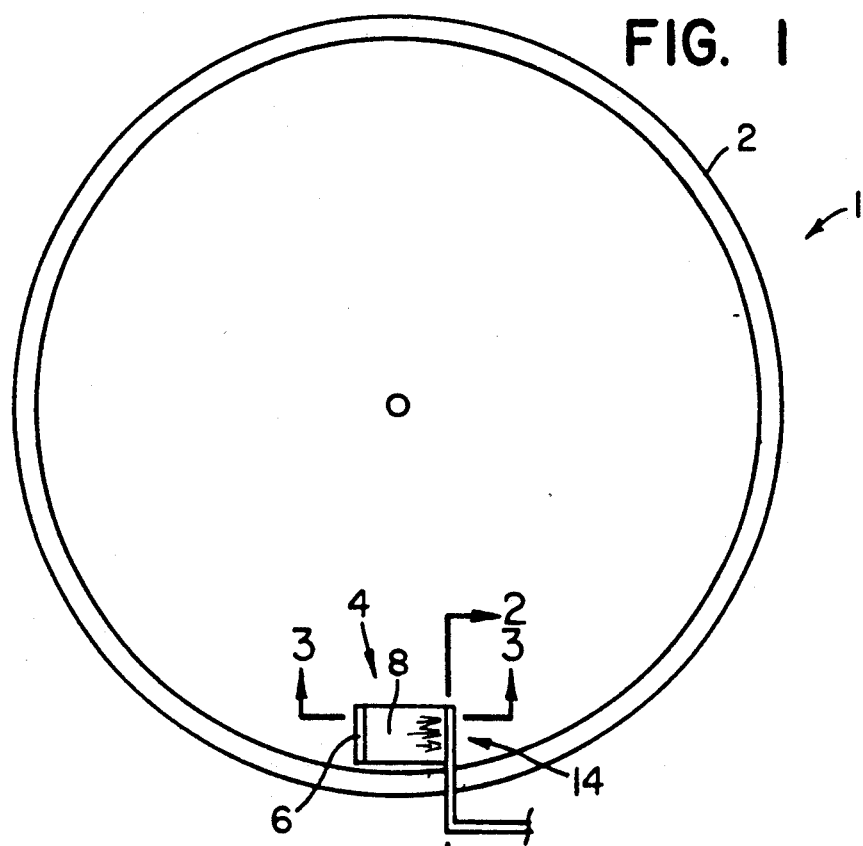
FIG. 1 is a plan view of a settling tank that has a drain trough spray nozzle installed.

Referring now to the drawings in greater detail, wherein like reference characters refer to like parts throughout the several figures, there is shown by the numeral 1 a settling tank of the type normally found at wastewater treatment facilities.

FIG. 1 shows the tank having a peripheral wall 2 that surrounds a volume of wastewater. Located proximate the wall is a drain trough 4 that includes a drain opening 6 and an angled scumboard 8. The drain opening is a rectangular opening that connects to a pipe 10. The pipe leads to either an evaporation pool or to another separate area where the scum can be treated. The scumboard is shown as having a leading or front end 11 that is submerged slightly below the top surface 12 of the liquid.

Figure 2:
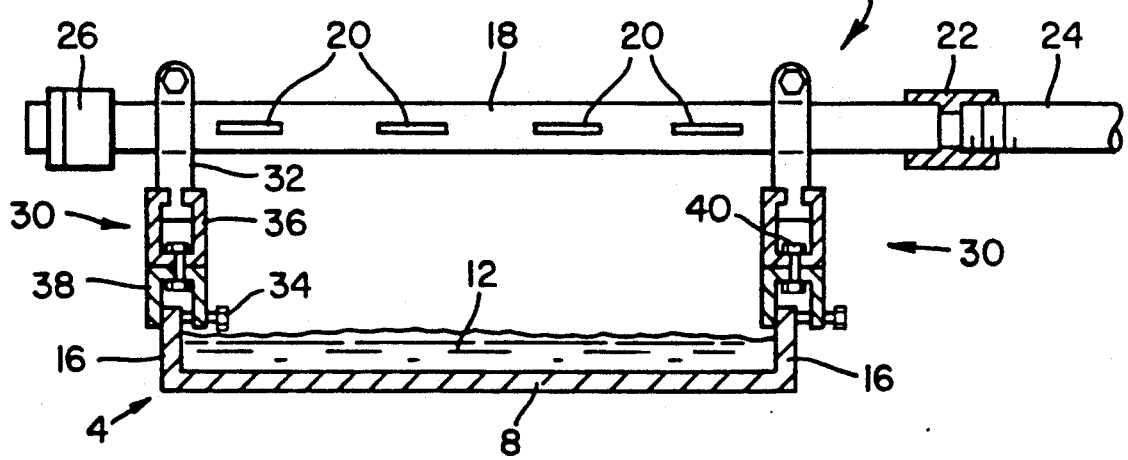
FIG. 2 is a detailed view of the drain trough spray nozzle.
Figure 3:
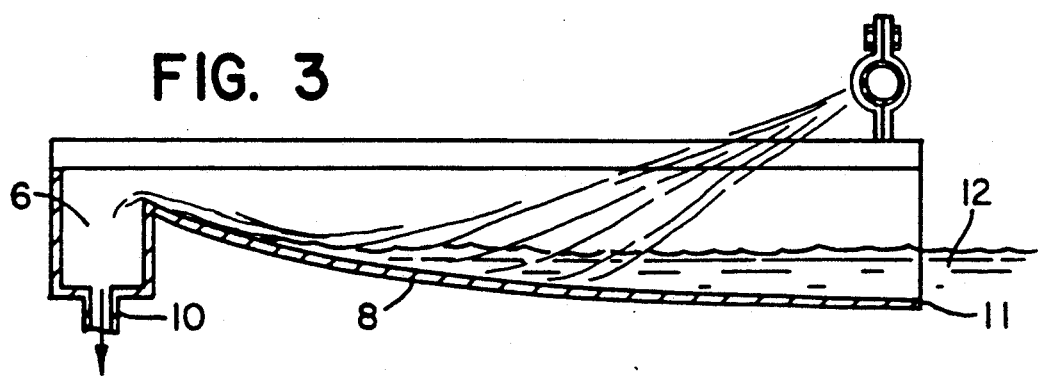
FIG. 3 is a side view of the drain trough and nozzle structure.

FIGS. 2 and 3 provide a more detailed view of the combined trough and nozzle structure.

FIG. 2 is a side view of the nozzle 14 showing it mounted onto the sidewalls 16 of the trough 4. The nozzle includes an elongated hollow body portion 18 that has a plurality of linearly spaced aligned outlet ports 20. One end of the body portion includes a connector 22 that attaches the nozzle to a supply pipe 24. The pipe 24 is connected to a source of pressurized water (not shown).

Each outlet port 20 is preferably slot-shaped and measures approximately two to four inches long and one-eighth inch high. Ports that have other shapes (circular, oval, square, etc.) may also be used. The ports are spaced along the length of the nozzle body to provide an even, dispersed spray pattern of water onto the scumboard. The outer end of the nozzle body is sealed by a removable cap 26 that allows access to the interior of the nozzle body to facilitate any required cleaning thereof.

The nozzle body is adjustably attached to the drain trough by a pair of bracket structures 30. Each bracket structure includes a top mounted strap clamp 32 that functions to attach the nozzle body to the top of the bracket. Each strap clamp can be loosened to thereby allow the nozzle body to be rotated within the straps. This enables the operator to adjust the direction of the nozzle spray. Rotating the body so that the ports are angled downward causes the sprayed liquid to impinge on the scumboard closer to it leading end 11. Rotating the nozzle body in the opposite direction causes the spray to impinge on the scumboard closer to the drain opening 6. The bottom of each bracket structure includes a clamp 34 that removably engages the upper portion of the trough's sidewall. This allows the nozzle to be adjustably placed along the top of the trough thereby enabling the operator with the ability to change the impingement location and direction of the nozzle spray on the scumboard. To facilitate the adjustment process, each bracket has a top portion 36 and bottom portion 38. The two bracket portions are pivotally connected by a through-bolt 40. Loosening of all the clamps (32, 34) allows an operator to fully adjust the nozzle. By allowing the nozzle body to also slide within the strap clamps, the nozzle can even be angled relative to the longitudinal axis of the trough. For example, if the operator did not want the water spray to be aimed directly toward the drain opening, he or she could slide one of the clamps along the trough wall until the outlet ports are aimed toward a corner of the trough. In this manner, a slight amount of separation of the scum can be accomplished in the trough.

Figure 4:
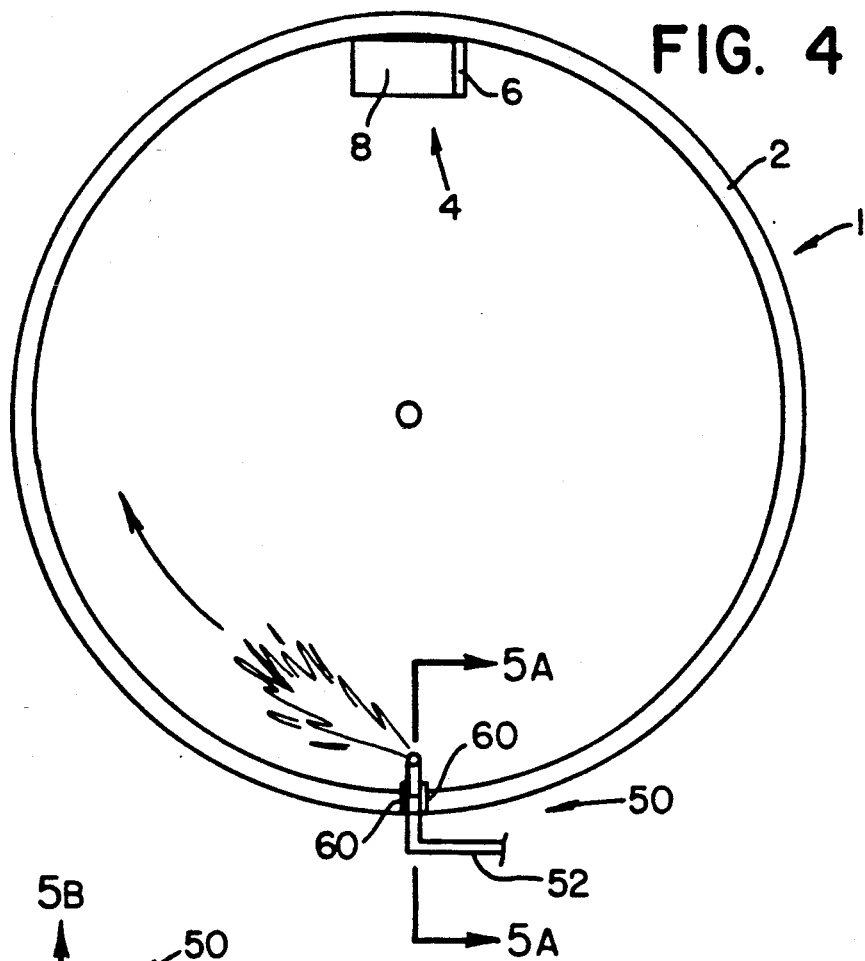
FIG. 4 is a plan view of a settling tank that has a surface spray nozzle installed.

FIG. 4 provides a plan view of a settling tank 1 that incorporates a surface spray nozzle 50. The tank includes a drain trough 4 having a drain opening 6 and scumboard 8. Located adjacent the wall 2 of the tank is a spray nozzle 50 that is connected to a source of pressurized water (not shown) by a flexible hose 52. The nozzle is shown spraying water in an angled direction onto the tank's surface scum layer. This direction of spraying causes the scum layer to move in a circular fashion about the center of the tank. During this movement, centrifugal force causes the heavier elements of the scum layer to move outwardly along the circular path of travel. As the scum layer travels about the tank, its outer portion is forced into the drain trough where it is drained from the tank. This continual circular motion of the scum layer eventually results in almost complete removal of the scum layer from the tank.

Figure 5A:
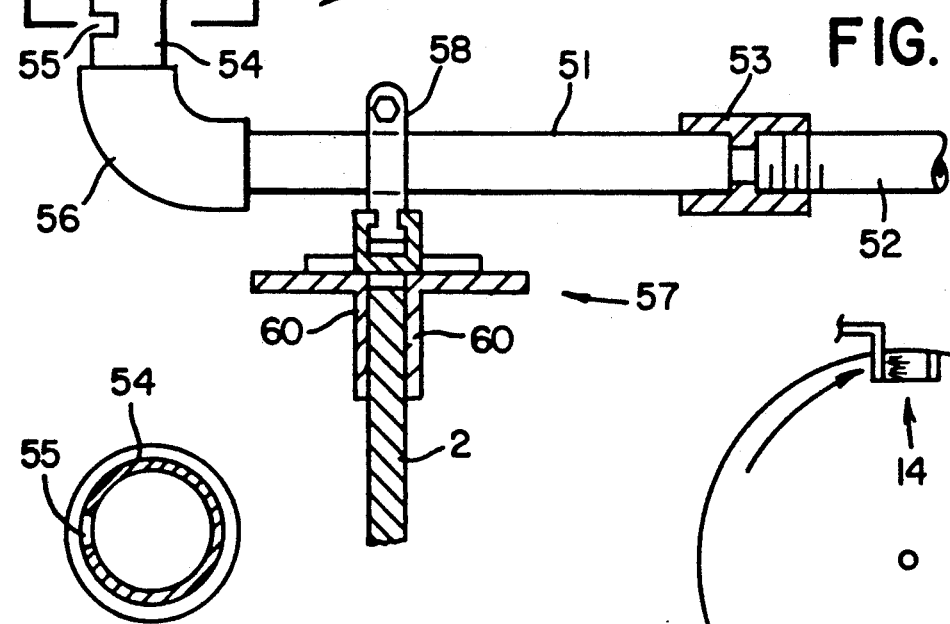
FIG. 5A is a detailed view of the surface spray nozzle.
Figure 5B:
FIG. 5B is a cross-section of the nozzle taken at the location of the outlet port.

FIG. 5A provides a detailed side view of the surface spray nozzle 50. The nozzle is made from an "L"-shaped hollow tubular body 51 that has one end attached to a water supply hose 52 by a connector 53. Located in a sidewall of an upwardly extending portion 54 of the nozzle body is a single slot-like outlet port 55. The upper portion 54 of the nozzle is threadedly engaged to a bottom portion 56 of the nozzle. This threaded engagement allows the operator to turn the upper portion relative to the bottom portion and thereby redirect the spraying liquid without moving the nozzle relative to the wall 2. As can be seen in FIG. 5B, the port extends for approximately 30 degrees of arc along the circumference of the nozzle body and is cut in the body in a manner that matches the body's radius of curative.

The nozzle body 51 is fixed to a bracket assembly 57 by a circular clamp 58. The bracket assembly includes a pair of depending leg portions 60 that bracket a vertical top portion of the tank wall 2. The leg portions are approximately two to five inches in height and function to fix and stabilize the nozzle on the tank wall. While sandwiching the wall 2, the leg portions are spaced from each other by a distance that allows the bracket assembly to slide along the wall's upper portion. In this manner, the nozzle can be slid along the entire circumference of the tank and thereby be capable of spraying onto the top surface of any portion of the contained wastewater within the tank. In an alternative method of moving the nozzle, the nozzle and bracket assembly can be vertically lifted and disengaged from the tank's wall. The operator can carry the nozzle to any other location on the tank's wall and then lower it onto the top portion of the tank wall in the new location.

Figure 6:
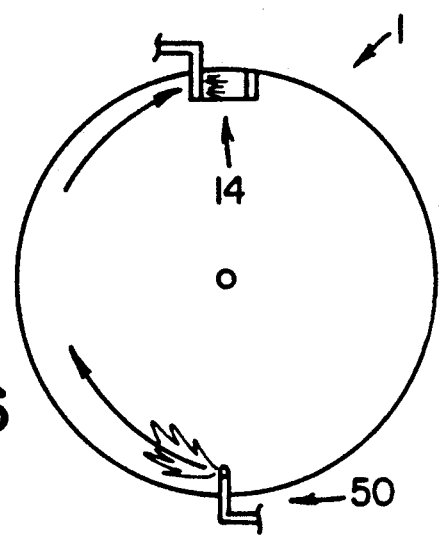
FIG. 6 is a plan view of a settling tank showing the combined use of a drain trough spray nozzle and a surface spray nozzle.

FIG. 6 shows a sediment tank that has both types of nozzles installed. This embodiment combines the unique properties and advantages of both nozzle types to form a system that can rapidly and effectively skim the top scum layer from a sediment tank 1.

The operation of the three embodiments will now be detailed.

In the embodiment shown in FIG. 1, the nozzle 14 sprays down onto the scumboard in the direction of the trough's drain opening 6. The forced flow of water along the trough creates a suction or vacuuming effect on the tank's surface layer of scum near the trough. This causes the scum to be drawn into the drain trough and to flow into the drain along with the liquid sprayed from the nozzle's multiple ports. Continuous action of the drain trough nozzle causes the tank's top scum layer to begin a circular rotation and be drawn into the drain.

In the embodiment shown in FIG. 4, the nozzle 50 sprays water onto the tank's surface in a direction that causes a rotational movement of the tank's scum layer about the center of the tank. It should be noted that the nozzle's outlet port is only one to two feet above the level of the wastewater and the water sprayed from the nozzle is directed almost across the surface of the wastewater within the tank. In other words, the water from the nozzle is aimed so that it imparts the maximum force on the water's surface in a vector parallel to the water's surface. This produces a maximum rotational force on the scum layer while minimizing any downward mixing effect. The circular movement of the scum layer causes an outward centrifugal movement of the scum. As the scum moves outward, it pushes into the drain trough and is skimmed into the drain opening. If the wind conditions are unfavorable to the direction of the water spray (i.e.—cause the spray to be directed away from a desired path), the operator can slide or relocate the nozzle to another location on the tank's wall where it will not be adversely affected by the wind conditions.

The embodiment shown in FIG. 6 employs two nozzles that individually function in the same manner as previously described. However, the combined use of both type of nozzles provides a superior skimming of the scum layer when compared to any of the prior art skimming units or to the independent action of either of the two nozzles. As the surface spray nozzle pushes the scum layer toward the drain trough, the drain trough nozzle pulls the scum into the drain.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention.

I claim:

1. A liquid settling structure and skimming system comprising:
   a drain means operatively connected to a circular liquid setting structure wherein said drain means includes an inlet at least partially in contact with an upper layer of a volume of liquid contained within said structure;
   a spray means located proximate said drain inlet and connected to a source of pressurized liquid whereby liquid spraying from said spray means impinges on said drain inlet and acts to draw at least a portion of said upper layer of contained liquid into said drain means;
   wherein said spray means comprises an elongated tubular body having a plurality of outlet ports that sprays said pressurized liquid in a direction toward a rear portion of said drain means; and
   wherein said drain inlet includes two spaced vertically extending walls and an angled bottom portion connecting said walls and wherein said tubular body of said spray means is mounted atop said walls and extends in a direction substantially perpendicular to said walls and wherein said outlet ports are spacedly located along said tubular body and spray liquid onto said angled bottom portion in a direction toward said rear portion of said drain means.

2. The system of claim 1 wherein said plurality of outlet ports have slot-like openings.

3. The system of claim 1 wherein said mounting of said tubular body of said spray means includes adjustment means that enable the adjustment of the direction at which the outlet ports spray liquid relative to the bottom portion of the drain inlet.

4. The system of claim 3 wherein said mounting of said tubular body further includes adjustment means that enable the tubular body to be movably attached on said vertically extending walls of said drain inlet.

5. The system of claim 1 further comprising a second spray means operatively connected to the settling structure and located on a perimeter portion of said structure wherein said second spray means is operatively connected to a source of pressurized liquid and includes an outlet port that directs liquid sprayed from said spray means proximate the perimeter portion of said structure toward the top layer of contained liquid within said structure and causes the top layer of contained liquid to move in a circular manner about the center point of said tank in a direction towards said drain inlet.

6. The system of claim 5 wherein said second spray means is attached to a top portion of said perimeter portion of said structure.

7. The system of claim 6 wherein said second spray means is movably attached to the top portion of said perimeter portion of said settling structure whereby the second spray means can be moved from one location on said structure to another location on said structure.

8. A liquid settling structure and skimming system comprising:
   a drain means operatively connected to a circular liquid settling structure wherein said drain means has an inlet portion at least partially in contact with an upper layer of a volume of liquid contained within said settling structure; and
   a first spray means attached to a portion of a peripheral wall of said structure wherein said first spray means is supplied with liquid from a pressurized liquid source and sprays liquid from an outlet port located proximate said peripheral wall onto the upper layer of liquid contained within said settling structure and wherein said sprayed liquid is directed to cause said contained liquid to move in a circular manner about a center point of said settling structure in a direction towards said drain inlet and to at least partially flow into the inlet portion of the drain means;
   wherein said first spray means is movably attached to said peripheral wall and can thereby be moved to allow liquid to be sprayed onto said contained liquid from any one of a plurality of different locations along the peripheral wall; and
   wherein a second spray means is located proximate said drain means and includes an outlet means whereby liquid from a pressurized source of liquid is sprayed out of said outlet means of said second spray means and onto the inlet portion of said drain means thereby suctioning at least a portion of said upper layer of contained liquid into said drain means.

9. The system of claim 8 wherein said outlet port of said spray means is slot shaped.

10. The system of claim 8 wherein said spray means is adjustable wherein the spray means can be maintained in the same position but the outlet port can be moved to enable a redirecting of the pressurized liquid as it is sprayed from the spray means.

11. The system of claim 8 wherein said second spray means is adjustably mounted on said inlet portion of said drain means whereby said outlet means of said second spray means can be adjusted to cause liquid sprayed from said second spray means to impinge on said drain means in a plurality of different locations.

12. The system of claim 8 wherein said outlet means of said second spray means comprises a plurality of linearly aligned openings.

13. The system of claim 12 wherein at least one of said aligned openings is in the form of a rectangular slot.

14. The system of claim 8 wherein said drain means includes two sidewalls and wherein said second spray means includes a plurality of outlet means that are spacedly located in a plane substantially perpendicular to the two sidewalls of the drain means.

* * * * *